United States Patent Office 2,833,681
Patented May 6, 1958

2,833,681

EPOXY RESINS CURED WITH A FLUORINE-CONTAINING ANHYDRIDE

Samuel J. Nelson and James S. Sconce, Niagara Falls, and Paul Robitschek, Wilson, N. Y., assignors to Hooker Electrochemical Company, Niagara Falls, N. Y., a corporation of New York No Drawing. Application August 23, 1956
Serial No. 605,705

14 Claims. (Cl. 154—43)

This invention relates to new epoxy resin compositions and more specifically refers to such compositions containing combined fluorine and to processes for their production. The major class of epoxy resins is generally prepared by reacting a polyhydric phenol such as 4,4'-isopropylidene diphenol with an epoxide compound such as epichlorhydrin. The linear resin thus formed is then conventionally cross-linked by tertiary or secondary amines such as benzyl dimethyl amine or piperidine; by polyamines such as ethylene diamine, diethylene triamine or metaphenylene diamine; by Lewis acids such as boron trifluoride; by anhydrides of polycarboxylic acids such as phthalic anhydride; or by more complex resinous products such as phenol- or urea-formaldehyde resins. The resins thus produced exhibit excellent properties and their production in industry is continually increasing. However, they have several disadvantages. First, they are flammable and cannot be used where flame resistance is required. Second, they tend to decompose or lose their strength when subjected to elevated temperatures. A method has been disclosed in United States Patent 2,744,845 where an epoxy resin is rendered fire-resistant by curing with hexachloroendomethylenetetrahydrophthalic anhydride, sold under the registered trademark "HET" anhydride by the Hooker Electrochemical Company. The product of that patent has good flame-resistant properties but is still subject to decomposition upon the application of extreme heat. Consequently it is not satisfactory for those uses where good physical and electrical properties are desired for very high temperature operation over a prolonged period.

It is an object of the present invention to provide an epoxy resin composition which is flame-resistant. It is a further object to provide an epoxy resin which is flame-resistant and in addition can be operated at very high temperatures without appreciable loss of desirable properties. Further objects and advantages of the present invention will become apparent from the following description of the invention.

It has been found that epoxy resin compositions may be prepared which are both flame-resistant and stable at relatively very high temperatures by first preparing a linear epoxy resin by reacting a polyhydric compound together with an epoxide-containing compound such as epichlorhydrin, and subsequently cross linking this resin with a fluorine-containing polycarboxylic anhydride which is a Diels-Alder adduct of a fluorine-containing cyclopentadiene and maleic anhydride. The cured resin thus formed has excellent physical properties, flame-resistance and remains stable when subjected to high temperatures.

The polyhydric compound used to prepare the linear epoxy resin may be any one of a large number of compounds falling among several well-defined groups. Among the polyhydric compounds are phenols such as the mononuclear phenols, for example, hydroquinone or resorcinol; dinuclear phenols such as 4,4'-isopropylidene-diphenol (bisphenol A) or 4,4'-methylenediphenol; polynuclear phenols such as the condensation products of phenol with formaldehyde known as novalaks. Among polyhydric compounds are also polyhydric alcohols such as ethylene glycol, propylene glycol, glycol polyethers, glycerine and so on. Among the epoxide containing compounds which are used to react with the polyhydric compounds are epihalohydrins such as epichlorhydrin, epibromhydrin etc. Such compounds as glycidyl dichlorohydrin may also be used. The epoxy resins so formed are also known as glycidyl ethers.

The linear resin or glycidyl ether is generally formed by reacting one mole of the phenolic compound with greater than one mole of the epichlorhydrin in the presence of strong aqueous sodium hydroxide as a catalyst in order that more than one and up to two moles of the epichlorhydrin will react with each mole of the polyhydric phenol. A molar excess of the epoxide-containing compound is used so that the chains terminate in epoxide groups, through which subsequent cross linking takes place. The reaction is generally carried out at elevated temperatures. When a sufficient degree of condensation has been reached, the resin is washed free of the inorganic compounds, dried, cooled, and subsequently mixed with the curing agent for cross linking.

The fluorine-containing carboxylic anhydrides used as curing agents are prepared by first forming a fluorine-containing diene, and subsequently forming the adduct of this compound in a Diels-Alder reaction with maleic anhydride. The resulting adduct may then be used to cross-link the epoxy resin. The preferred adduct, hereafter referred to as difluoro HET anhydride, is 1,4,5,6-tetrachloro-7,7-difluorobicyclo-(2.2.1)-5-heptene - 2,3-dicarboxylic anhydride. Other similar compounds are 1,5,6-trichloro - 4,7,7 - trifluorobicyclo-(2.2.1)-5-heptene-2,3-dicarboxylic anhydride, 1,4-dichloro-5,6,7,7-tetrafluorobicyclo-(2.2.1)-5-heptene - 2,3 - dicarboxylic anhydride and 1,4,5,6,7,7-hexafluorobicyclo-(2.2.1)-5-heptene-2,3-dicarboxylic anhydride.

Although a large number of epoxy resins may be used in the present invention, the most commonly used ones are those which are condensation products comprised of bisphenol A and epichlorhydrin. These resins are sold under various trademarks, among which are the trademarks of Epon by Shell Chemical Co. and Araldite by Ciba Ltd. Resins based on the condensation product of glycerol and epichlorhydrin are also commercially available.

The proportion of the fluorine-containing dicarboxylic anhydride is not critical and will in general depend upon the properties desired. If a low degree of flame-resistance is desired, as little as 25 percent of the anhydride may be used. If high flame-resistance is desired, as much as 75 percent may be used based on the total weight of the resin plus anhydride. The preferred range is between about 35 percent and about 65 percent.

Difluoro HET anhydride may be used in numerous ways to harden epoxy resins. A liquid epoxy resin may be heated to 120–140 degrees centigrade and the powdered anhydride added. The mixture is again heated to 120–140 degrees centigrade with stirring. The anhydride dissolves within a few minutes to form a clear solution, which can then be cast in a mold and cured, preferably at a temperature between 80 degrees centigrade and 200 degrees centigrade. Alternatively the anhydride may be added to the epoxy resin at room temperatures and dissolved with stirring and heating to 120 degrees centigrade or more.

With very finely divided anhydrides, preferably 200 mesh or finer, a paste can be made at room temperature with the epoxy resin, and the resulting paste cast and cured by heating to a suitable curing temperature. The anhydride dissolves and forms a clear casting.

A further method, useful with solid epoxy resins is to ball mill the resin and anhydride together. The resulting mixture can then be heated under pressure to give clear moldings.

A further method for using epoxy resins with difluoro HET anhydride is in the preparation of laminates. A solution can be prepared in which the epoxy resin and anhydride are dissolved in an aromatic solvent, such as benzene or toluene, or a ketonic solvent, such as acetone or methyl ethyl ketone. The solution is then used to coat a laminating material such as glass cloth or paper, the solvent driven off with heat, and the laminate then formed under heat and pressure. High strength laminates of excellent electrical properties are obtained in this way.

Fillers may also be used with these castings to impart changes in the physical or electrical properties. For example, aluminum powder may be added to improve thermal conductivity. Other fillers can be used for example, to reduce the thermal coefficient of expansion, improve the impact strength or change electrical properties in a desired manner.

The following examples illustrate, but do not limit the use of difluoro HET anhydride with epoxy resins.

EXAMPLE 1

Difluorohexachlorocyclopentene was first prepared according to the method disclosed by E. T. McBee, D. K. Smith and H. E. Ungnade, JACS, vol. 77, 387–389 (1955), page 388, by reacting octachlorocyclopentene, antimony trifluoride, and antimony pentachloride and extracting and purifying as therein disclosed. The difluorohexachlorocyclopentene was then reacted by the method also therein described with dilute hydrochloric acid, zinc dust, copper sulfate and water to produce 5,5-difluorotetrachlorocyclopentadiene. The 5,5-difluorotetrachlorocyclopentadiene thus produced was then reacted also according to the method described by this reference with maleic anhydride and heated to 90 degrees centigrade. The resulting product, 1,4,5,6-tetrachloro - 7,7 - difluorobicyclo-(2.2.1)-5-heptene-2,3-dicarboxylic anhydride was recrystallized as the dicarboxylic acid from hot water. It may then be reconverted to the anhydride by refluxing in chlorobenzene, with a moisture trap to remove the water, crystallizing and drying.

EXAMPLE 2

Ten grams of Araldite 6020, an epoxy resin comprised of bisphenol A and epichlorhydrin, having an epoxy equivalent of 0.44–0.48 equivalent of epoxy groups per 100 grams resin, were heated in a test tube to a temperature of about 115 degrees centigrade in a 120 degree centigrade oil bath. Ten grams of difluoro HET anhydride (1,4,5,6-tetrachloro - 7,7 - difluorobicyclo-(2.2.1)-5-heptene-2,3-dicarboxylic anhydride) were then added to this mixture. The mixture was stirred until the anhydride was dissolved and the resulting liquid was then poured into a heated glass mold. This mold was placed in a circulating air oven at 160 degrees centigrade for 15½ hours. The casting was removed and a heat distortion test (ASTM D–648–45T) run at fibre stress of 264 pounds per square inch. The heat distortion temperature obtained was 178 degrees centigrade.

The following example illustrates the improved high temperature properties of the cured epoxy resin of the present invention compared with the epoxy resin cured by the corresponding adduct of maleic anhydride with hexachlorocyclopentadiene.

EXAMPLE 3

One part by weight of Araldite 6020 was reacted with one part by weight of HET anhydride in a similar manner to Example 2. For comparison, one part of Araldite 6020 was reacted with one part difluoro HET anhydride (1,4,5,6-tetrachloro - 7,7-difluorobicyclo-(2.2.1)-5-heptene-2,3-dicarboxylic anhydride) in the same manner as described above in Example 2. Both mixtures were reacted at 120 degrees centigrade and subsequently cured in an oil bath at a temperature of 140 to 145 degrees centigrade for about 15½ hours. In order to test the weight loss after prolonged heating, both materials were placed in an oven maintained at a temperature of about 200 degrees centigrade. Table I below shows the data obtained as a result of aging up to 60 days. It can be seen that after 60 days the sample cured with HET anhydride has a weight loss of 15.6 percent while the sample cured with difluoro HET anhydride had a weight loss of only 2.85 percent.

*Table I*

| Days Aging at 200 degrees centigrade | HET Anhydride | | Difluoro HET Anhydride | |
|---|---|---|---|---|
| | Total Wt. loss, percent | Rate of Weight loss percent per day from previous weighing | Total Wt. loss, percent | Rate of weight loss percent per day from previous weighing |
| 7 | 0.50 | 0.07 | 0.51 | 0.07 |
| 12 | 0.97 | 0.09 | 0.81 | 0.06 |
| 19 | 1.67 | 0.10 | 1.14 | 0.05 |
| 25 | 2.52 | 0.14 | 1.37 | 0.04 |
| 30 | 3.75 | 0.25 | 1.62 | 0.05 |
| 44 | 7.29 | 0.25 | 2.24 | 0.45 |
| 60 | 15.6 | 0.52 | 2.85 | 0.04 |

Table II below illustrates the effect of using various amounts of difluoro HET anhydride on the heat distortion of the castings subsequently produced. The method of preparation was generally the same as described in Example 2 except that the curing was carried out at 120 degrees centigrade and 180 degrees centigrade as indicated in the table. Araldite 6020 is a condensation product of bisphenol A and epichlorhydrin.

*Table II*

| Examples | Parts Anhydride per 100 Resin | Percent Anhydride | Heat Distortion Temperature, degrees centigrade | |
|---|---|---|---|---|
| | | | Cured 24 hrs. at 120 degrees centigrade | Cured 24 hrs. at 180 degrees centigrade |
| 4 | 40 | 28.6 | 55 | 54 |
| 5 | 80 | 44.5 | 136 | 155 |
| 6 | 100 | 50. | 139 | 172 |
| 7 | 120 | 54.5 | 139 | 170 |
| 8 | 140 | 58.3 | 139 | 162 |
| 9 | 160 | 61.5 | | 150 |
| 10 | 200 | 66.7 | | 125 |

Table III below illustrates the effect of cure temperature and cure time on heat distortion temperature of Araldite 6020 cured with difluoro HET anhydride. The manner of preparation was same as Example 2 and the anhydride-epoxy weight ratio was one to one.

*Table III*

| Examples | Cure Temperature, Degrees centigrade | Cure Time, Hours | Heat Distortion Temperature, Degrees centigrade |
|---|---|---|---|
| 11 | 140 | 4 | 147 |
| 12 | 140 | 10 | 159 |
| 13 | 140 | 24 | 164 |
| 14 | 160 | 4 | 168 |
| 15 | 160 | 10 | 176 |
| 16 | 160 | 24 | 179 |
| 17 | 180 | 4 | 164 |
| 18 | 180 | 10 | 169 |
| 19 | 180 | 24 | 169 |
| 20 | 200 | 4 | 161 |
| 21 | 200 | 10 | 161 |
| 22 | 200 | 24 | 160 |

The following examples show the curing of glycerol based epoxies with difluoro HET anhydride.

EXAMPLE 23

Four grams of Epon 562 (an epoxy resin based on glycerine and epochlorhydrin) and 6.0 grams of difluoro HET anhydride were stirred together in a test tube at room temperature to form a paste. The test tube containing the paste was heated in a 120 degree centigrade oil bath. In about three minutes the temperature of the mix was 120 degrees centigrade, and a clear solution had formed. This solution gelled in an additional one to two minutes. After 20 hours at 120 degrees centigrade the material had cured to a solid which was hard at room temperature.

EXAMPLE 24

Three grams of Epon 562 and 6.6 grams of difluoro HET anhydride were mixed together and cured in a manner similar to Example 23 above. (In both of these examples the reactions, being exothermic carried the temperatures 15 to 20 degrees centigrade above the bath temperature.) After curing for 20 hours at 120 degrees centigrade the resulting product was hard both at 120 degrees centigrade and at room temperature.

EXAMPLE 25

140 grams of Araldite 6020 were heated in a 120 degree centigrade oil bath to a temperature of 115 degrees centigrade. 140 grams of difluoro HET anhydride were then added and stirred into the resin at a bath temperature of about 120 to 125 degrees centigrade. All the anhydride dissolved in about 15 minutes when the temperature of the mix was 118 degrees centigrade. The liquid material was then poured into a mold prepared from two glass plates sized with a chlorosilane, clamped together and preheated to 120 degrees centigrade. The mold was placed in a circulating air oven at 120 degrees centigrade, and the temperature raised in 15 minutes to 160 degrees centigrade. The casting was then heated for 24 hours at 160 degrees centigrade. At the end of that period it was cooled slowly and removed from the mold. Table IV below shows the electrical properties obtained from measurement of the castings at room temperature.

*Table IV*

ELECTRICAL PROPERTIES OF DIFLUORO HET ANHYDRIDE CURED EPOXY RESIN CASTINGS

| Property | Test | Result |
| --- | --- | --- |
| Volume Resistivity | ASTM D 257-54T | $>1.85 \times 10^{15}$ ohm-cm. |
| Surface Resistivity | | $>1 \times 10^{16}$ ohms. |
| Dielectric Constant | ASTM D 150-54T | |
| at $10^6$ cycles/second | | 3.09. |
| at $10^3$ cycles/second | | 3.17. |
| at 60 cycles/second | | 3.19. |
| Dissipation Factors | ASTM D 150-54T | |
| at $10^6$ cycles/second | | 0.015. |
| at $10^3$ cycles/second | | 0.0072. |
| at 60 cycles/second | | 0.0033. |

Another sample of material prepared as in Example 26 was cast into a sheet and cut into pieces 6" x 0.5" x 0.125". When these pieces were placed in a bunsen flame they ignited but were self-extinguishing upon removal of the flame. They were rated as self-extinguishing by ASTM D635-44.

EXAMPLE 26

One hundred grams Araldite 6020 and 120 grams difluoro HET anhydride were dissolved in 100 milliliters of benzene. The resulting solution was used to impregnate 181 type glass cloth and the impregnated cloth was dried at 100 degrees centigrade until just tack-free at room temperature. Twelve plies of dry, impregnated cloth were stacked and pressed for 120 minutes at 160 degrees centigrade. A laminate resulted of one eighth of an inch thickness, possessing a high degree of strength, hardness both at room temperature and 140 degrees centigrade and which was immediately self-extinguishing upon removal of flame.

EXAMPLE 27

30 grams of Araldite 6020 and 30 grams of difluoro HET anhydride were mixed, and the anhydride dissolved by heating with stirring to 125 degrees centigrade. 140 grams of aluminum powder were then added and stirred into the resin. The mixture was cast, and heated for 10 hours at 160 degrees centigrade. The cured casting had relatively high thermal conductivity and low coefficient of thermal expansion making it suitable for such applications as mold surfaces.

It is to be understood that the above described examples are simply illustrative of the application of the principles of the invention. Numerous other variations may be readily devised by those skilled in the art which will embody the principles of the invention and fall withing the spirit and scope thereof.

We claim:

1. A polymerizable composition comprising (A) a glycidyl ether of a polyhydric compound having a 1,2-epoxy equivalency of more than one and (B) a fluorobicyclo heptene dicarboxylic anhydride.

2. A composition according to claim 1 wherein said polyhydric compound is a dihydric phenol.

3. A composition according to claim 2 wherein the dihydric phenol is 4,4'-isopropylidenediphenol.

4. A composition according to claim 3 wherein the 1,2-epoxy equivalency is between one and two.

5. A composition according to claim 4 wherein the fluorobicyclo heptene dicarboxylic anhydride (B) is 1,4,5,6-tetrachloride-7,7 - difluorobicyclo - (2.2.1) - 5-heptene-2,3-dicarboxylic anhydride.

6. A composition according to claim 1 wherein said polyhydric compound is an aliphatic polyhydric alcohol.

7. A composition according to claim 6 wherein the aliphatic polyhydric alcohol is glycerol.

8. A composition according to claim 7 wherein the fluorobicyclo heptene dicarboxylic anhydride is 1,4,5,6-tetrachloro-7,7-difluorobicyclo-(2.2.1)-5-heptene - 2,3 - dicarboxylic anhydride.

9. A composition of claim 1 when polymerized to an infusible, insoluble resinous composition.

10. A composition of claim 1 when mixed with an inert filler and polymerized to an infusible, insoluble resinous composition.

11. A reinforced plastic article comprising a composition of claim 1 when polymerized to an infusible, insoluble, resinous composition, and a fibrous reinforcing medium.

12. A laminated article comprising a plurality of sheets of glass fibrous material and as a binder therefor, an infusible, insoluble, resinous composition resulting from the polymerization of a composition defined in claim 1.

13. A process for the curing of a polymerizable composition comprised of a glycidyl ether of 4,4'-isopropylidenephenol which comprises reacting said glycidyl ether with a fluorobicyclo heptene dicarboxylic anhydride at temperatures between about 70 degrees centigrade and about 200 degrees centigrade.

14. A process according to claim 13 wherein said fluorobicyclo heptene dicarboxylic anhydride is 1,4,5,6-tetrachloro-7,7-difluorobicyclo-(2.2.1)-5-heptene-2,3 - dicarboxylic anhydride.

References Cited in the file of this patent

UNITED STATES PATENTS 2,744,845    Rudoff _____ May 8, 1956